US012404860B2

(12) United States Patent
Nielsen et al.

(10) Patent No.: US 12,404,860 B2
(45) Date of Patent: Sep. 2, 2025

(54) METHOD AND APPARATUS FOR DETECTING HYDRAULIC SHOCK

(71) Applicant: GRUNDFOS HOLDING A/S, Bjerringbro (DK)

(72) Inventors: Torben Nielsen, Bjerringbro (DK); Jesper Thørring Damgaard, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 0 days.

(21) Appl. No.: 18/716,403

(22) PCT Filed: Nov. 16, 2022

(86) PCT No.: PCT/EP2022/082067
§ 371 (c)(1),
(2) Date: Jun. 4, 2024

(87) PCT Pub. No.: WO2023/088931
PCT Pub. Date: May 25, 2023

(65) Prior Publication Data

US 2025/0020128 A1 Jan. 16, 2025

(30) Foreign Application Priority Data

Nov. 17, 2021 (DK) ............................ PA202170570

(51) Int. Cl.
*F04D 15/00* (2006.01)

(52) U.S. Cl.
CPC ...... *F04D 15/0088* (2013.01); *F05D 2260/80* (2013.01)

(58) Field of Classification Search
CPC ............ F04D 15/0077; F04D 15/0083; F04D 15/0088; F04B 51/00; F04B 49/06; F04B 49/065; F05D 2260/80
See application file for complete search history.

(56) References Cited

U.S. PATENT DOCUMENTS

| | | | |
|---|---|---|---|
| 9,435,684 | B2 | 9/2016 | Baldwin |
| 11,199,837 | B2 | 12/2021 | Cella et al. |

(Continued)

FOREIGN PATENT DOCUMENTS

| | | | |
|---|---|---|---|
| CN | 103759140 | A | 4/2014 |
| CN | 104373331 | A | 2/2015 |

(Continued)

OTHER PUBLICATIONS

International Search Report and Written Opinion of the ISA/EP in PCT/EP2022/082067, Feb. 23, 2023, 10 pages.

(Continued)

*Primary Examiner* — Loren C Edwards
(74) *Attorney, Agent, or Firm* — ICE MILLER LLP; Justin D. Swindells

(57) ABSTRACT

Disclosed herein are embodiments of an apparatus for detecting hydraulic shock events in a fluid system, the fluid system comprising a pump assembly, the pump assembly comprising a pump, in particular a centrifugal pump, and a pump motor, the apparatus comprising means for monitoring a pump speed of the pump and/or for monitoring a motor frequency; and a processing unit configured to detect a variation in the monitored pump speed and/or motor frequency; and detect a hydraulic shock event from the detected variation in the monitored pump speed and/or motor frequency.

10 Claims, 7 Drawing Sheets

(56) References Cited

U.S. PATENT DOCUMENTS

| | | | |
|---|---|---|---|
| 2006/0071666 | A1 | 4/2006 | Unsworth et al. |
| 2013/0173178 | A1 | 7/2013 | Poczka et al. |
| 2014/0142871 | A1 | 5/2014 | Lombriser et al. |
| 2017/0178030 | A1 | 6/2017 | Pal |
| 2017/0241422 | A1* | 8/2017 | Munk .................. F04D 29/669 |
| 2018/0017623 | A1 | 1/2018 | Zillinger et al. |
| 2018/0223831 | A1 | 8/2018 | Zhang et al. |
| 2020/0348662 | A1 | 11/2020 | Cella et al. |
| 2021/0215645 | A1 | 7/2021 | Owens et al. |

FOREIGN PATENT DOCUMENTS

| | | | |
|---|---|---|---|
| CN | 108279088 | A | 7/2018 |
| CN | 110060789 | A | 7/2019 |
| CN | 112050289 | A | 12/2020 |
| EP | 3263963 | A1 | 1/2018 |
| EP | 3647597 | A1 | 5/2020 |
| GB | 2497997 | A | 7/2013 |
| JP | 2020530159 | A | 10/2020 |
| KR | 101936587 | B1 | 1/2019 |
| TW | M544657 | U | 7/2017 |
| WO | 2015/197141 | A1 | 12/2015 |
| WO | 2018198111 | A1 | 11/2018 |

OTHER PUBLICATIONS

Antal Szabo, "Introduction to Condition-Based Maintenance (17970)," open.unido.org, Dec. 31, 1989 [136 Pages].

* cited by examiner

METHOD AND APPARATUS FOR DETECTING HYDRAULIC SHOCK

CROSS-REFERENCE TO RELATED APPLICATIONS

This application is a National Stage of International Application No. PCT/EP2022/082067 filed Nov. 16, 2022, which claims priority to Denmark Patent Application No. PA202170570 filed Nov. 17, 2021, the disclosures of which are incorporated herein by reference in their entirety.

TECHNICAL FIELD

The present disclosure relates to a method and apparatus for detecting hydraulic shock in a fluid system.

BACKGROUND

Hydraulic shock, often also referred to as water hammer or fluid hammer, refers to a pressure surge or wave caused when a fluid in motion, in particular a liquid, is forced to suddenly stop, change direction or otherwise experience a sudden change in momentum. Hydraulic shock may occur on a fluid system when a valve in a pipe closes suddenly causing a pressure wave to propagate along the pipe.

Fluid systems often include one or more pumps, and hydraulic shock is a common cause of failure in pumps. A pump continuously experiencing hydraulic shock may eventually suffer from fatigue wear. If a hydraulic shock event is potent enough, even a single event can damage the pump. Aside from the pump, hydraulic shock events can also cause serious damage to other parts of a fluid system, e.g. to sensors and/or the like. Hydraulic shock may also cause noise and vibration in a fluid system and may even result in pipe rupture or collapse.

On this background, it is generally desirable to be able to monitor the frequency and/or severity of occurrences of hydraulic shock events. Based on such monitoring, the operating procedures of a fluid system may be adjusted, or other countermeasures may be implemented, in order to avoid or at least reduce the frequency and/or severity of future hydraulic shock events.

It is desirable that the detection of hydraulic shock can be conducted without sensors that require direct contact to the fluid being transported in the fluid system, in particular without pressure sensors measuring the fluid pressure. This is desirable, because sensors that need to be in contact with the transported fluid are at risk of being damaged by the hydraulic shock events they are intended to detect. Moreover, without reliance on such sensors, the detection setup is easier to implement and easier to maintain.

WO 2015/197141 A1 discloses a method for detecting faults or operational parameters in a pump assembly by use of a handheld communication device. This prior art method comprises the steps of: a) contactless measuring a sound signal emanating from the pump assembly by use of a microphone connected to or implemented in the handheld communication device, b) processing the measured sound signal, and c) recognizing one or more sound emanating condition including any possible faults by way of the processed sound signal.

Vibrations and/or sound in a fluid system may have a variety of causes. Accordingly, it may be difficult to reliably identify hydraulic shock as the cause of sound or vibrations. It thus remains desirable to provide an improved or at least and alternative method and/or apparatus for detecting hydraulic shock in a fluid system. It is further generally desirable to provide a method and/or apparatus for detecting hydraulic shock events that is accurate, robust, fast and cost efficient.

SUMMARY

According to one aspect, disclosed herein are embodiments of an apparatus for detecting hydraulic shock events in a fluid system, the fluid system comprising a pump assembly, the pump assembly comprising a pump, in particular a centrifugal pump, and a pump motor, the apparatus comprising means for monitoring a pump speed of the pump and/or a motor frequency of the pump motor; and a processing unit configured to:

detect a variation in the monitored pump speed and/or motor frequency; and detect a hydraulic shock event from the detected variation in the monitored pump speed and/or motor frequency.

The inventors have realized that the pressure impulse of a hydraulic shock event typically applies so much energy to the pump that the pump controller cannot keep the rotational speed of the pump and/or the motor frequency, steady. Consequently, a hydraulic shock event affects the pump speed and/or the motor frequency. Accordingly, a detected variation in the pump speed and/or the motor frequency can serve as a reliable indicator of a hydraulic shock event.

In some embodiments, the pump comprises a shaft that is configured to be driven by the pump motor. In some embodiments, the pump comprises an impeller that is rotationally driven by the shaft. Accordingly, the pump speed may be measured as a rotational speed, or frequency, of the shaft and/or of the impeller.

In some embodiments, the pump motor is an electric motor, which may be driven by a periodically varying magnetic field, in particular where a rotor of the motor is driven by a periodically varying magnetic field. To this end, the pump motor may be driven by a periodically varying electrical drive current for producing the varying magnetic field. The motor frequency may thus be represented as a frequency of the variation of the periodically varying magnetic field and/or as a frequency of the electrical drive current for producing the varying magnetic field, or as another suitable measure of the rotational frequency of the motor. The electric motor may comprise a stator and a rotor and the varying magnetic field may be a varying stator magnetic field. The motor may be driven by a variable frequency drive or another suitable motor drive providing the electrical drive current for the motor.

In most situations, there may be a one-to-one correspondence between the motor frequency and the pump speed. However, in some situations, e.g. when there is an amount of slip between the motor and the shaft driving the pump, the motor frequency and the pump speed may differ. Nevertheless, a hydraulic shock event typically affects the pump speed, in particular the rotational speed of the impeller or of the shaft driving the impeller, as well as the motor frequency of the pump motor. Therefore, a detected variation of the pump speed and a detected variation of the motor frequency can each serve as a reliable indicator of a hydraulic shock event. In some embodiments, the apparatus may even monitor both the pump speed and the motor frequency.

In some embodiments, the means for sensing the motor frequency includes a magnetic field sensor and/or a sensor for measuring an electrical drive current of the motor. The magnetic field sensor may be configured, in particular positioned, such that the magnetic field sensor measures the varying magnetic field for driving the electric motor, in particular for driving the rotor of the electric motor. The sensor for sensing the electrical drive current may be integrated into the a motor drive circuit or it may be a separate sensor for measuring the electrical drive current or a quantity from which the electrical drive current can be derived.

The pump speed, in particular the shaft speed or the impeller speed, may be represented as a frequency, e.g. a number of rotations per unit time. In some embodiments, the means for monitoring the pump speed includes a tachometer or other sensor configured to measure the rotational speed of a shaft driving the impeller.

The detected variation may be a peak or other type of fluctuation. In particular, the detected variation may be a sudden peak or fluctuation in the monitored pump speed and/or motor frequency, in particular a peak or fluctuation having a duration and/or magnitude consistent with a hydraulic shock event. Here the term sudden fluctuation refers to peaks or other types of fluctuations on a time scale consistent with hydraulic shock events. Typical hydraulic shock events occur on a time scale of about 100 milliseconds. A pressure impulse associated with a hydraulic shock event may bounce back and forth in a system and go on for several seconds, e.g. for up to about 5-10 seconds, i.e. the detected fluctuations of the pump speed and/or motor frequency may have a duration consistent with these time scales.

The apparatus may be configured to detect a hydraulic shock event responsive to detecting a variation in the monitored pump speed and/or motor frequency that fulfills one or more trigger criteria. Examples of trigger criteria include a magnitude, in particular an amplitude, of the detected variation exceeding a threshold. Further examples of trigger criteria include the duration and/or attack time and/or decay time of a detected variation being smaller than a corresponding threshold and/or falling inside a certain range. Alternatively or additionally, other trigger criteria indicative of the significance of a peak may be used.

The inventors have found that a computationally efficient, robust and reliable detection of hydraulic shock events can be obtained based on the detection of fluctuations, in particular sudden fluctuations, of the monitored pump speed and/or motor frequency, the fluctuations having a magnitude exceeding a predetermined threshold. In some embodiments, the apparatus may thus be configured to obtain a pump speed and/or motor frequency signal indicative of the monitored pump speed and/or motor frequency as a function of time. In some embodiments the apparatus may further be configured to perform a filtering of the obtained pump speed and/or motor frequency signal. In some embodiments, the filtering is or includes a high-pass filtering so as to suppress slow variations of the pump speed and/or motor frequency signal.

Alternatively or additionally, the filtering may include a low-pass filtering, a band-pass filtering and/or another type of filtering.

The apparatus, in particular the processing unit, may further be configured to:

- detect fluctuations in the pump speed and/or motor frequency signal, in particular in the filtered, e.g. high-pass filtered, pump speed and/or motor frequency signal,
- compute a magnitude of the detected fluctuation, and
- detect a hydraulic shock event responsive to the computed magnitude exceeding a threshold, in particular a predetermined and/or an adaptively and automatically determined threshold.

The apparatus may detect the fluctuations by computing an envelope signal of the pump speed and/or motor frequency signal, in particular of the filtered, e.g. high-pass filtered, pump speed and/or motor frequency signal, and to detect peaks in the computed envelope signal.

In some embodiments, the apparatus is configured to detect a hydraulic shock event based on the monitored pump speed and/or motor frequency alone, in particular based on detected variations of the monitored pump speed and/or motor frequency. In other embodiments, the apparatus is configured to detect a hydraulic shock event based on the monitored pump speed and/or motor frequency in combination with one or more additional detected indicators of a hydraulic shock event, e.g. in combination with a detected vibration of the pump or of another component of the fluid system.

In particular, in some embodiments, the apparatus further comprises a vibration sensor configured to detect vibrations of a component of the fluid system, and wherein the processing unit is configured to:

- detect a vibration event; and
- detect a hydraulic shock event responsive to a detected vibration event in addition to the detected variation in the monitored pump speed and/or motor frequency.

In particular, the detected vibration events allow for a reliable detection of the severity of a detected hydraulic shock event while the concurrent detection of variations in the pump speed and/or motor frequency allows for a reliable elimination of false positive detections.

The vibration event may be detected as a peak in a vibration signal measured by the vibration sensor or derived from a sensor signal of the vibration sensor. The vibration sensor may be an accelerometer or another sensor configured to detect mechanical vibrations of a component of the fluid system, e.g. a pipe or a pump.

The vibration sensor and the means for monitoring the pump speed and/or motor frequency may be provided as separate sensor units. Alternatively, the vibration sensor and a sensor for monitoring the pump speed and/or motor frequency, in particular a magnetic field sensor, may be integrated into a single sensor unit having a housing that accommodates the vibration sensor and the sensor for monitoring the pump speed and/or motor frequency. Optionally, the sensor unit may include one or more further sensors and/or signal processing circuitry. Examples of further sensors include a temperature sensor. Accordingly, such an integrated sensor unit may easily be installed. For example, an existing pump assembly may easily be retrofitted with such a sensor unit. The sensor unit may be communicatively connected via a wired or wireless connection to the data processing unit.

The vibration signal may be a signal representing sensed accelerations as a function of time or a signal representing a sensed or derived velocity as a function of time. The inventors have realised that use of a vibration velocity signal provides a more reliable hydraulic shock detection, in particular a more reliable assessment of the severity of a hydraulic shock event. Accordingly, if the vibration sensor is an accelerometer measuring accelerations, it is preferred that the apparatus transforms, e.g. by means of an integrator, the measured vibration acceleration signal into a corresponding vibration velocity signal. Accordingly, when the vibration sensor is configured to sense accelerations, the apparatus, in particular the processing unit, may be configured to derive a vibration velocity signal from the sensed vibration acceleration signal, e.g. by means of an integrator. The vibration velocity is the rate of change in the position of the component whose vibrations are sensed by the vibration sensor. Vibration velocity may be expressed as a displacement per unit time, e.g. expressed in units of meters per second. In particular, the vibration acceleration signal may be an oscillating acceleration signal. Similarly, the vibration velocity signal may be an oscillating velocity signal.

The detected vibration event may be detected as a peak having a duration and/or magnitude consistent with an electric shock event. To this end, the apparatus may be configured to detect a hydraulic shock event responsive to detecting a peak in the vibration signal that fulfills one or more trigger criteria. Examples of trigger criteria include a magnitude, in particular an amplitude, of the detected peak exceeding threshold. Further examples of trigger criteria include the duration and/or attack time and/or decay time of a detected peak being smaller than a corresponding threshold and/or falling inside a certain range.

The inventors have found that a computationally efficient, robust and reliable detection of hydraulic shock events can be obtained based on the detection of peaks in the vibration signal that have a magnitude exceeding a predetermined threshold, when the apparatus also detects a corresponding peak/fluctuation in the monitored pump speed and/or motor frequency. In some embodiments, the apparatus may be configured to perform a filtering of the obtained vibration signal, e.g. a high-pass filtering so as to suppress slow variations of the vibration signal. The apparatus, in particular the processing unit, may further be configured to detect peaks in the vibration signal, in particular in the filtered, e.g. high-pass filtered, vibration signal, to compute a magnitude of the detected peak and to detect a hydraulic shock event responsive to the computed magnitude exceeding a threshold, in particular a predetermined and/or an adaptively and automatically determined threshold. The apparatus may detect the peaks by computing an envelope signal of the (optionally high-pass filtered) vibration signal and to detect peaks in the computed envelope signal.

The processing unit may be configured to detect a hydraulic shock event responsive to a detected vibration having a predetermined temporal relationship with the detected variation in the monitored pump speed and/or motor frequency. To this end, the predetermined temporal relationship may be chosen so as to detect a common cause of the detected vibration event and the detected variation in the monitored pump speed and/or motor frequency. The predetermined temporal relationship between the peak in the vibration signal and the detected variation in the monitored pump speed and/or motor frequency may be the peak in the vibration signal and the detected variation in the monitored pump speed and/or motor frequency occurring within one or more predetermined time windows from each other.

For example, when the vibration sensor is positioned on or in close proximity to the pump assembly whose pump speed and/or motor frequency is monitored, the processing unit may be configured to detect a hydraulic shock event responsive to a detected vibration event being substantially simultaneous with the detected variation in the monitored pump speed and/or motor frequency, i.e. within a short time window of each other, e.g. within 1 s of each other or even within a smaller time window. When the vibration sensor is positioned spaced apart from the pump assembly whose pump speed and/or motor frequency is monitored, e.g. on a pipe or another component of the fluid system located at a distance from the pump assembly, the processing unit may be configured to detect a hydraulic shock event responsive to a detected variation in the monitored pump speed and/or motor frequency which precedes or is delayed compared to the detected vibration event, in particular precedes or is delayed corresponding to the propagation time of a pressure wave from the location of the vibration sensor to the pump assembly. This may be achieved by detecting peaks that occur within a larger time window from each other. Alternatively, this may be achieved by detecting a variation in the monitored pump speed and/or motor frequency that occurs within one of two shorter time windows relative to a peak in the vibration signal, where one of the time windows precedes the peak in the vibration signal by a predetermined offset and the other time window is delayed relative to the peak in the vibration signal by a predetermined offset.

In some embodiments, the predetermined time window may be selected large enough so as to cover a number of possible placements of the vibration sensor, e.g. by detecting peaks that occur within 0.5 s, such as within 1 s, such as within 2 s, such as within 5 s, or within another suitable time window from each other. In other embodiments, the size and/or offset of the time window or time windows may be chosen for a particular system configuration, e.g. based on a particular placement of the sensors relative to each other.

Accordingly, in some embodiments, the processing unit is configured to monitor the vibration signal and a signal indicative of the pump speed and/or motor frequency to detect peaks in both signals. The processing unit is configured to detect a hydraulic shock event as the occurrence of peaks/fluctuations, in particular significant peaks, in both signals where the peaks have a predetermined temporal relationship, e.g. occurring simultaneous or in another predetermined temporal alignment. The processing unit may be configured to determine the detected peaks/fluctuations as being significant peaks/fluctuations based on one or more criteria, such as one or more predetermined criteria. Examples of such criterion include the magnitude of the detected peaks/fluctuations exceeding a threshold. Generally, the magnitude of a peak/fluctuation may be measured as an amplitude of the peak/fluctuation, as an area under the peak/fluctuation or another suitable measure indicative of the magnitude of a peak/fluctuation. Alternative or additional examples of criteria of the significance of a peak may be based on one or more other features of the detected peaks/fluctuations, e.g. of the attack characteristics or decay characteristics of the detected peaks/fluctuations, and/or the like.

Generally, the trigger criteria based on the vibration signal and/or the pump speed and/or motor frequency signal that are used for detecting hydraulic shock events may be predetermined, in particular selected so as to configure the sensitivity of the hydraulic shock detection while reducing the number of false positive detections. This may e.g. be done during an initial calibration period based on speed data observed for a particular fluid system. While the detection of hydraulic shock events has been found to be efficient, robust and reliable when based on predetermined trigger criteria, e.g. based on the magnitude or other measure of significance of the peaks, in other embodiments the apparatus may apply more complex techniques for analyzing the detected speed variations, e.g. based on machine-learning so as to classify a detected variation as caused by a hydraulic shock event or by other causes.

The processing unit may further be configured to compute a measure of severity of the detected hydraulic shock event, in particular from the detected peak in the vibration signal and/or from the detected peak in the signal representing the pump speed and/or motor frequency. Examples of suitable measures of severity include the computed magnitude of the detected fluctuation/peak, the duration, the attack time or the decay time of the detected fluctuation/peak, or a combination of more than one such criteria. The one or more measures of severity may be computed from the detected fluctuations/peaks in the pump speed and/or motor frequency signal and/or from the detected peaks in the vibration signal or from a combination of both.

One reliable measure of the severity of a hydraulic shock event is the magnitude of the pressure wave propagating through the fluid. However, it is desirable to assess the severity of a hydraulic shock event without the need for pressure measurements. The inventors have found that the magnitude of the measured vibration velocity is strongly correlated to the peak pressure of the pressure wave during a hydraulic shock event and, hence, may serve as another reliable measure of the severity of the hydraulic shock event, in particular a measure that does not require pressure measurements. Accordingly, the computed measure of the severity of the hydraulic shock event may be a measure of the magnitude of the detected peak in the vibration velocity signal, e.g. the amplitude of the peak or another measure of the magnitude of the peak as described above.

Generally, detecting a hydraulic shock event may comprise creating a hydraulic shock event alert, optionally including the computed measure of severity and/or other information, such as the time of occurrence, of the detected hydraulic shock event. Creating the hydraulic shock event alert may include outputting a hydraulic shock event alert via a user-interface, outputting/sending an alert signal via a data communications interface, and/or logging the hydraulic shock event alert.

The present disclosure relates to different aspects, including the apparatus described above and in the following, further methods, systems, devices and product means, each yielding one or more of the benefits and advantages described in connection with one or more of the other aspects, and each having one or more embodiments corresponding to the embodiments disclosed in connection with one or more of the other aspects described herein and/or as disclosed in the appended claims.

In particular, another aspect disclosed herein relates to embodiments of a computer-implemented method for detecting hydraulic shock events in a fluid system, the fluid system comprising a pump assembly, the pump assembly comprising a pump, in particular a centrifugal pump, and a pump motor, the method comprising:

- receiving data indicative of a monitored pump speed of the pump and/or a motor frequency of the pump motor;
- detecting a variation in the monitored pump speed and/or motor frequency; and
- detecting a hydraulic shock event from the detected variation in the monitored pump speed and/or motor frequency.

It is noted that features of various embodiments of the computer-implemented method described herein may be implemented at least in part in software or firmware and carried out on a data processing unit or other data processing system caused by the execution of program code means such as computer-executable instructions. Alternatively, the features of the computer-implemented method may be implemented by an otherwise suitably configured data processing unit.

Accordingly, another aspect disclosed herein relates to embodiments of a data processing unit configured to perform the acts of the computer-implemented method described herein. To this end, the data processing unit may have stored thereon program code configured, when executed by the data processing unit, to cause the data processing unit to perform the acts of the method described herein. The data processing unit may include a memory for storing a suitable computer program.

Here and in the following, the term data processing unit comprises any circuit and/or device suitably adapted to perform the above functions. The term data processing unit comprises general—or special—purpose programmable microprocessors, Digital Signal Processors (DSP), Application Specific Integrated Circuits (ASIC), Programmable Logic Arrays (PLA), Field Programmable Gate Arrays (FPGA), Graphical Processing Units (GPU), special purpose electronic circuits, etc., or a combination thereof. The data processing unit may be a data processing unit integrated into a pump assembly, e.g. as part of a pump control unit or as a separate data processing unit of the pump assembly. Alternatively, the data processing unit may be a data processing unit of a computing device or other data processing system external to the pump assembly.

Another aspect disclosed herein relates to a pump assembly comprising a data processing unit configured to perform the acts of an embodiment of the method described herein. The pump assembly comprises a pump and a pump motor for driving the pump. The pump may comprise an impeller. The pump assembly may further comprise a drive circuit controlling the pump motor. The data processing unit of the pump may be integrated into the drive circuit of the pump assembly, which controls the pump motor. Accordingly, the drive circuit of the pump assembly may be suitably programmed to perform an embodiment of the process described herein. Alternatively, the data processing unit may be integrated into another control unit of the pump assembly, different from the drive circuit, or it may be a completely separate data processing unit of the pump assembly.

Yet another aspect disclosed herein relates to embodiments of a computer program configured to cause a data processing unit to perform the acts of the computer-implemented method described above and in the following. A computer program may comprise program code means adapted to cause a data processing unit to perform the acts of the computer-implemented method disclosed above and in the following when the program code means are executed on the data processing unit. The computer program may be stored on a computer-readable storage medium, in particular a non-transient storage medium, or embodied as a data signal. The non-transient storage medium may comprise any suitable circuitry or device for storing data, such as a RAM, a ROM, an EPROM, EEPROM, flash memory, magnetic or optical storage device, such as a CD ROM, a DVD, a hard disk, and/or the like.

BRIEF DESCRIPTION OF THE DRAWINGS

The above and other aspects will be apparent and elucidated from the embodiments described in the following with reference to the drawing in which.

DETAILED DESCRIPTION

Figure 1:
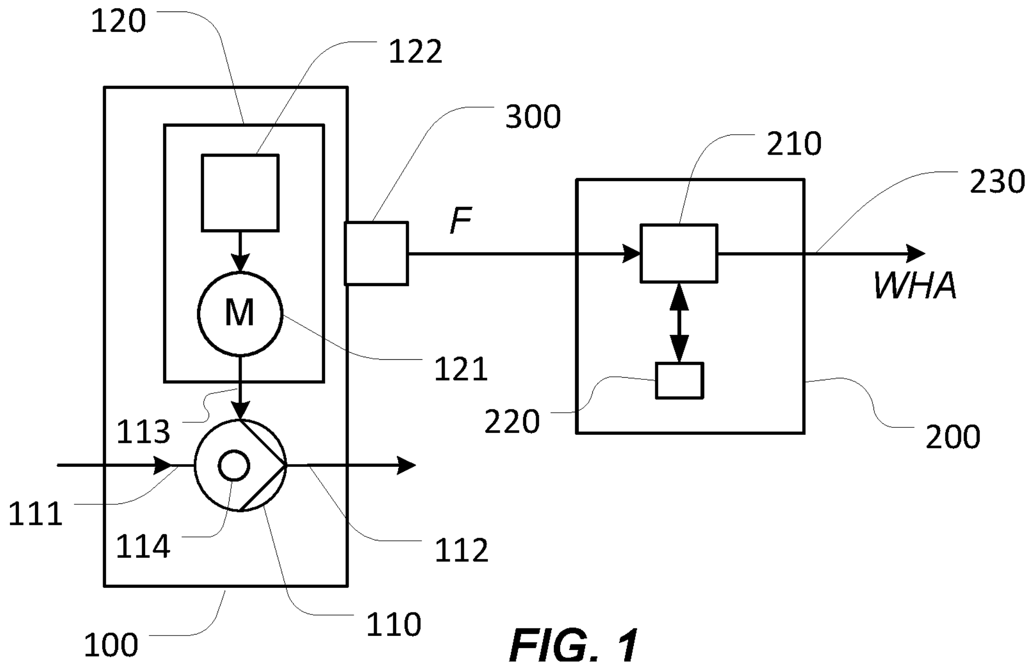
FIG. 1 schematically illustrates an embodiment of an apparatus for detecting hydraulic shock events in a fluid system.

FIG. 1 schematically illustrates an embodiment of an apparatus for detecting hydraulic shock events in a fluid system. The apparatus comprises a data processing unit 200 and a magnetic field sensor 300.

The fluid system comprises a pump assembly 100. The pump assembly 100 includes a pump 110 and a pump drive 120. The pump 110 may be a centrifugal pump or a different type of pump. The pump 110 has an inlet 111 for suction of water or a different fluid, such as of a different liquid. The pump 110 also has an outlet 112 for providing the output flow of the pump. The pump drive 120 comprises an electric motor 121 and a motor drive circuit 122. The motor drive circuit 122 may include a frequency converter for supplying the motor with electrical energy and/or other circuitry for controlling operation of the motor 121. The motor drive circuit 122 may be connectable to a suitable power supply (not shown) in order to supply the drive circuit, e.g. a frequency converter, with electric energy. During operation, the motor 121 drives the pump 110 causing the pump to pump fluid from the inlet 111 to the outlet 112. To this end, the motor 121 may drive a shaft 113 of the pump which, in turn, may drive an impeller 114 of the pump 110. Alternatively or additionally to the pump assembly 100, the fluid system may comprise one or more other components of the fluid system.

The magnetic field sensor 300 is attached to, or otherwise positioned in sufficient proximity of, the pump assembly 100 to sense the varying magnetic field, e.g. the varying magnetic flux, that drives the rotor of the electric motor 121 and that serves as a motor frequency signal indicative of the motor frequency, i.e. of the rotational speed of the motor. The magnetic field sensor 300 may be any suitable type of magnetic field sensor, also referred to as magnetometer. Examples of magnetic field sensors include, but are not limited to, a Hall Effect sensor, a coil sensor, a magneto-resistive sensor, a fluxmeter, and/or the like.

The data processing unit 200 comprises a suitably programmed or otherwise configured processor 210, e.g. a microprocessor, and a memory 220. The memory 220 has stored thereon a computer program and/or data for use by the processing unit. During operation, the data processing unit 200 receives input signals from the sensor 300 indicative of the measured magnetic field, in particular of the measured magnetic flux as a function of time. To this end, the magnetic field sensor 300 is communicatively connected to the data processing unit 200 and forwards a measured magnetic field signal as a function of time to the data processing system. The magnetic field signal may be indicative of a magnetic field strength, of a magnetic flux or of another suitable quantity indicative of the magnetic field. The magnetic field sensor 300 may be communicatively connected to the data processing unit 200 via a wired or wireless connection. In some embodiments, the magnetic field sensor and the data processing unit may be integrated into a single device, e.g. in a single housing.

The magnetic field sensor 300 may provide the input signals automatically or upon request by the data processing unit. The data processing unit 200 may receive the input signals intermittently, e.g. periodically, or (quasi-)continuously. The input signals may be analogue or digital. The data processing unit 200 processes the input signals detects hydraulic shock events based at least on the measured magnetic field signal as a function of time. An example of the processing will be described below.

The data processing unit 200 further comprises an output interface 230, e.g. a display or other user-interface and/or a data communications interface, an interface to a data storage device, and/or the like. The data processing system may thus be configured to output alerts responsive to detected hydraulic shock events and/or other information about detected hydraulic shock events. Additionally or alternatively, the data processing unit 200 may log the detected hydraulic shock events in memory 220.

In other embodiments, the apparatus may comprise another type of sensor for detecting a pump speed and/or motor frequency signal indicative of the speed of the pump as a function of time. Examples of such other types of sensors may include a tachometer for sensing the rotational speed of the impeller, e.g. by sensing the rotational speed of a shaft that is driven by the motor and that drives the impeller. The apparatus may include such other type of sensor in addition or alternative to the magnetic field sensor. Generally, the apparatus may base the hydraulic shock detection on a single pump speed and/or motor frequency signal from one sensor or from multiple pump speed and/or motor frequency signals from respective sensors.

Figure 2:
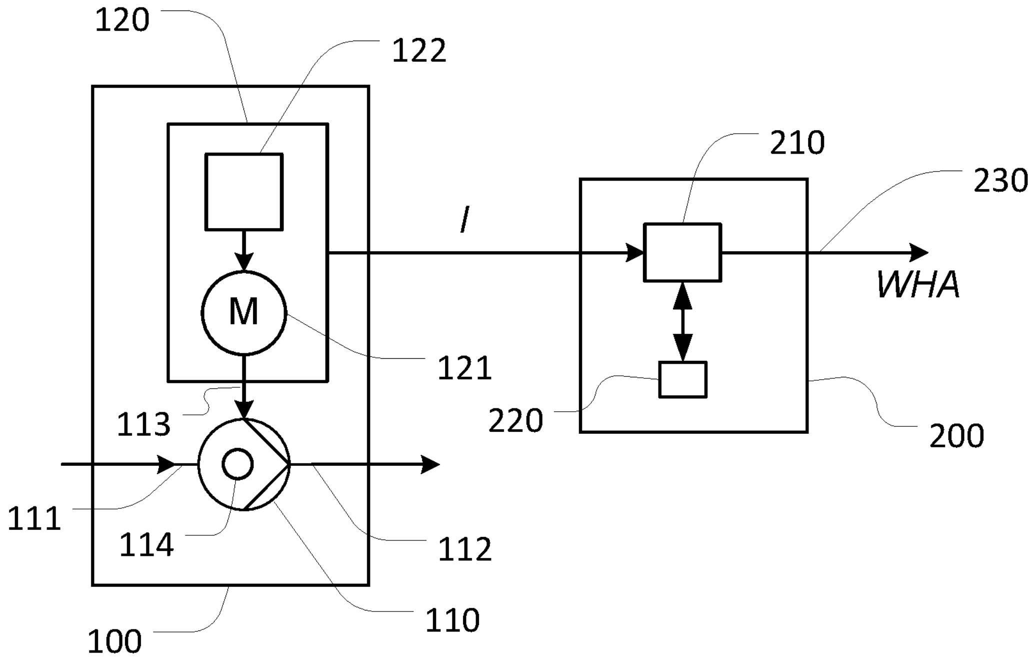
FIG. 2 schematically illustrates another embodiment of an apparatus for detecting hydraulic shock events in a fluid system.

FIG. 2 schematically illustrates another embodiment of an apparatus for detecting hydraulic shock events in a fluid system. The apparatus of FIG. 2 is similar to the apparatus of FIG. 1. In particular, the fluid system comprises a pump assembly 100 and the apparatus comprises a data processing unit 200, all as described in connection with FIG. 1.

Similar to the embodiment of FIG. 1, the apparatus of FIG. 2 also comprises means for monitoring a motor frequency of the pump motor. The apparatus of FIG. 2 differs from the embodiment of FIG. 1 only in that the data processing unit 200 receives an input signal indicative of the motor frequency directly from pump drive 120. In particular, the data processing unit may receive an input signal indicative of the drive current as a function of time, in particular of the frequency of the drive current. Accordingly, in the embodiment of FIG. 2, a separate magnetic field sensor may be omitted. It will be appreciated however, that some embodiments may base the hydraulic shock detection on a combination of pump speed and/or motor frequency signals from different sources.

Figure 3:
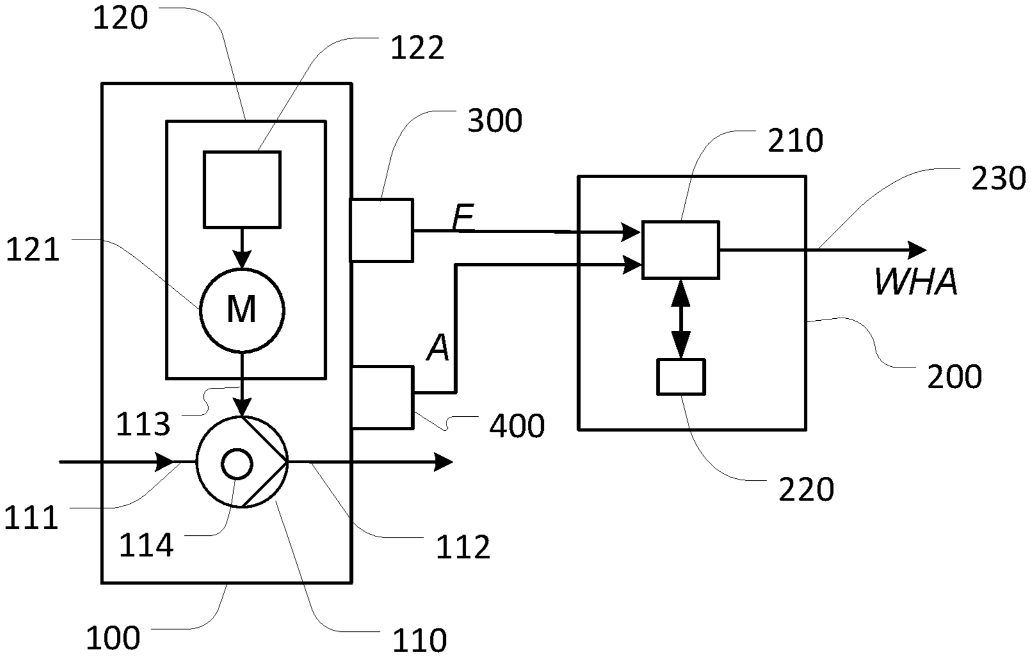
FIG. 3 schematically illustrates yet another embodiment of an apparatus for detecting hydraulic shock events in a fluid system.

FIG. 3 schematically illustrates yet another embodiment of an apparatus for detecting hydraulic shock events in a fluid system. The apparatus of FIG. 3 is similar to the apparatus of FIG. 1. In particular, the fluid system comprises a pump assembly 100 and the apparatus comprises a data processing unit 200 and a magnetic field sensor 300, all as described in connection with FIG. 1.

The apparatus of FIG. 3 differs from the embodiment of FIG. 1 only in that the apparatus further comprises a vibration sensor 400, e.g. an accelerometer, that is attached to the pump or to a another component of the fluid system or that is otherwise configured such that the vibration sensor detects vibrations of the pump or another component of the fluid system. Generally, for the purpose of the present disclosure, the term components of a fluid system refers to structural components of the fluid system other than the fluid that is being transported in the fluid system. Examples of such components include pipes, valves, boilers, pump assemblies, etc. The vibration sensor 400 is communicatively connected to the data processing unit 200 and forwards measured vibration signals as a function of time to the data processing system. The data processing unit 200 is configured to detect hydraulic shock events from a combination of the received magnetic field signal from magnetic field sensor 300 and of the vibration signal received from vibration sensor 400. An example of the processing will be described below.

Even though not expressly shown in the figures, it will be appreciated that the apparatus of FIG. 2 may also include a vibration sensor so as to allow the data processing unit to detect hydraulic shock events from a combination of the received drive current and of the vibration signal received from vibration sensor. Also, a vibration sensor may also be combined with other types of sensors for sensing the pump speed and/or motor frequency. Yet further, some embodiments may include multiple vibration sensors, e.g. at different locations of the fluid system.

In the examples of FIGS. 1-3, the data processing unit 200 is a data processing unit external to the pump assembly 100. Such an external data processing unit may be a suitably programmed computer or other data processing system external to the pump, in particular located remotely from the pump assembly. For example, the data processing unit may be a suitably programmed tablet computer, smartphone or the like. Other examples of a data processing unit may include a control system configured to control one or more components of the fluid system. In some embodiments, the external data processing unit may be embodied as a remote data processing system, e.g. a cloud-based system. The data processing system may be a distributed system including more than one computer.

In some embodiments, the data processing unit is a local data processing unit which may be integrated into the pump assembly 100 or which may be separate from the pump assembly 100 but mountable onto or otherwise located in close proximity to the pump assembly. For example, such a local data processing unit may be configured to be communicatively connected to one or more sensors, in particular to the sensor for sensing the pump speed and/or motor frequency and, optionally, to a vibration sensor. The local data processing unit may also be communicatively coupled to the pump drive. The local data processing unit may receive and process sensor signals from the connected sensors and, optionally, information received from the drive circuit.

The data processing unit, in particular the local data processing unit, may include a display or other type of user interface for displaying the result of the processing. For example, the data processing unit may be configured to output alerts indicative of detected hydraulic shock events, data indicative of the number, frequency and/or severity of detected shock events and/or other information pertaining to the detected shock events. A local data processing unit may further be configured to communicate with a remote data processing system, e.g. a cloud-based system, via a suitable communications network. The remote data processing system may include further functionality for data analysis, data logging, data presentation and/or the like.

In the embodiments of FIG. 2, if the data processing unit is internal to the pump drive 120, the data processing unit 200 may receive an input signal indicative of the electrical drive current from the motor drive circuit 122 via an internal interface, e.g. a data bus or another suitable wired or wireless interface. It will be appreciated that the data processing unit 200 may partly or completely be integrated with the motor drive circuit. For example, a single control circuit may be configured to control operation of the motor 121 and be configured to perform the detection of the hydraulic shock events.

When the computation is based on a magnetic field sensor or another type of sensor for sensing the pump speed and/or motor frequency, or on a magnetic field sensor (or other type of sensor for sensing the pump speed and/or motor frequency) and on a vibration sensor, some or all of these sensors may also be integrated into the pump or they may be external to the pump and connected to the data processing unit via a suitable wired or wireless connection. Such sensors may be provided as separate sensors. Alternatively, some or all of the sensors may be integrated into a single sensor unit, optionally with further sensors for sensing other quantities useful for monitoring other aspects of the fluid system. For example, the vibration sensor 400 and the magnetic field sensor 300 of the embodiment of FIG. 3 may be provided as separate sensor units or as a single integrated sensor unit.

Generally, the communication between data processing system and the sensors or the motor drive circuit may be via a direct communication link or an indirect link, e.g. via one or more nodes of a communications network. Examples of a wired connection include a local area network, a serial or parallel wired communications link, etc. Examples of wireless connections include radio frequency communications link, e.g. Wifi, Bluetooth, cellular communication, etc.

Figure 4:
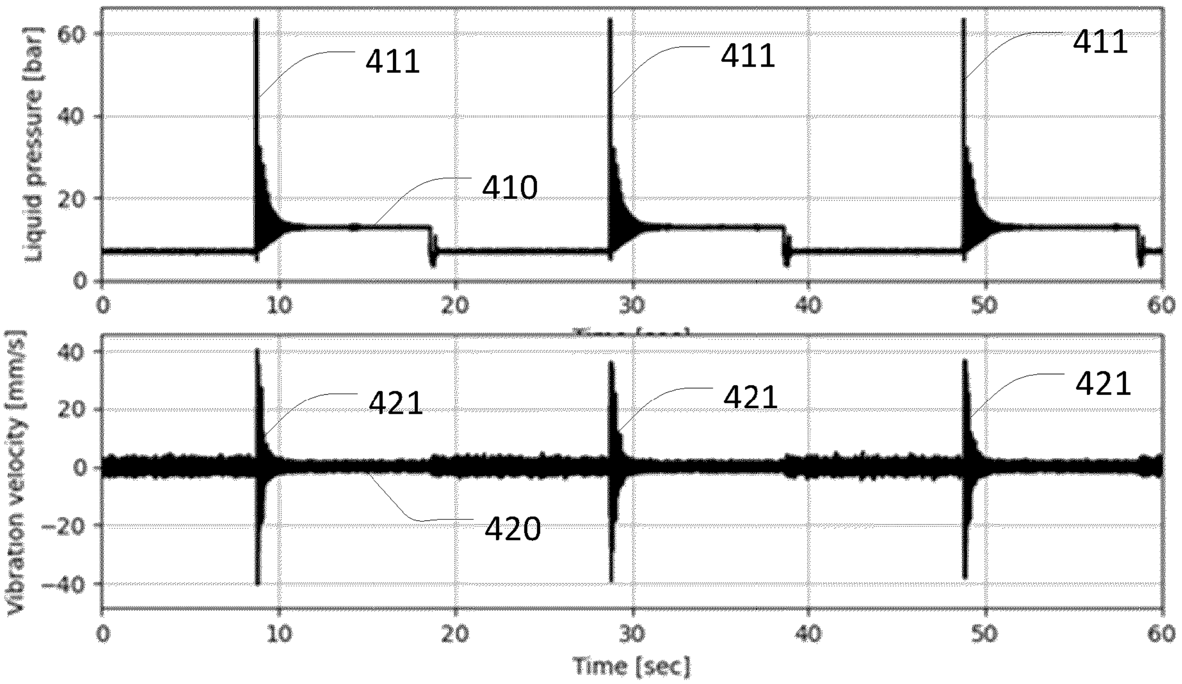
FIG. 4 schematically illustrates a monitored pressure and a monitored vibration signal.

FIG. 4 schematically illustrates a monitored liquid pressure in a fluid system and a monitored vibration signal. In particular, FIG. 4 shows two graphs representing measured quantities associated with a fluid system in which a liquid is pumped through pipes. The vibration signal represents measured vibrations of a component of the fluid system, e.g. the pump. The quantities are measured as a function of time and the graphs represent measured values over a period of 60 s. During this time, three distinct hydraulic shock events have occurred. The upper graph 410 shows the liquid pressure of the liquid in the fluid system, as measured by a pressure sensor. As can be seen from graph 410, a hydraulic shock event is easily detectable and can be quantified by a pressure measurement in the liquid, as illustrated by the three peaks 411 in the measured pressure. Accordingly, such pressure measurements may be used to calibrate the hydraulic shock detection based on measured pump speed and/or motor frequency signals and/or vibration signals as described herein, e.g. in order to choose thresholds and/or other parameters of the detection. For example, such measurements may be performed for a given pump or type of pumps when connected to a fluid system test bed.

The lower graph 420 illustrates vibrations measured by a vibration sensor positioned on the pump. As can be seen in FIG. 4, the hydraulic shock events can also be detected as distinct peaks 421 in the measured vibration signal, as each hydraulic shock event results in a distinct vibration shock. Even though a hydraulic shock event can be detected by vibration analysis alone, a sudden rise in amplitude of the vibration signal with following ringing out is not a unique signature for hydraulic shock events. Other events may cause a similar vibrational pattern, e.g. hitting the pump with the palm of your hand or other types of sudden mechanical impact onto a structural component of the fluid system. Consequently, a hydraulic shock detection based solely on vibration analysis will inevitably be prone to errors in the form of false positive detections.

Figure 5:
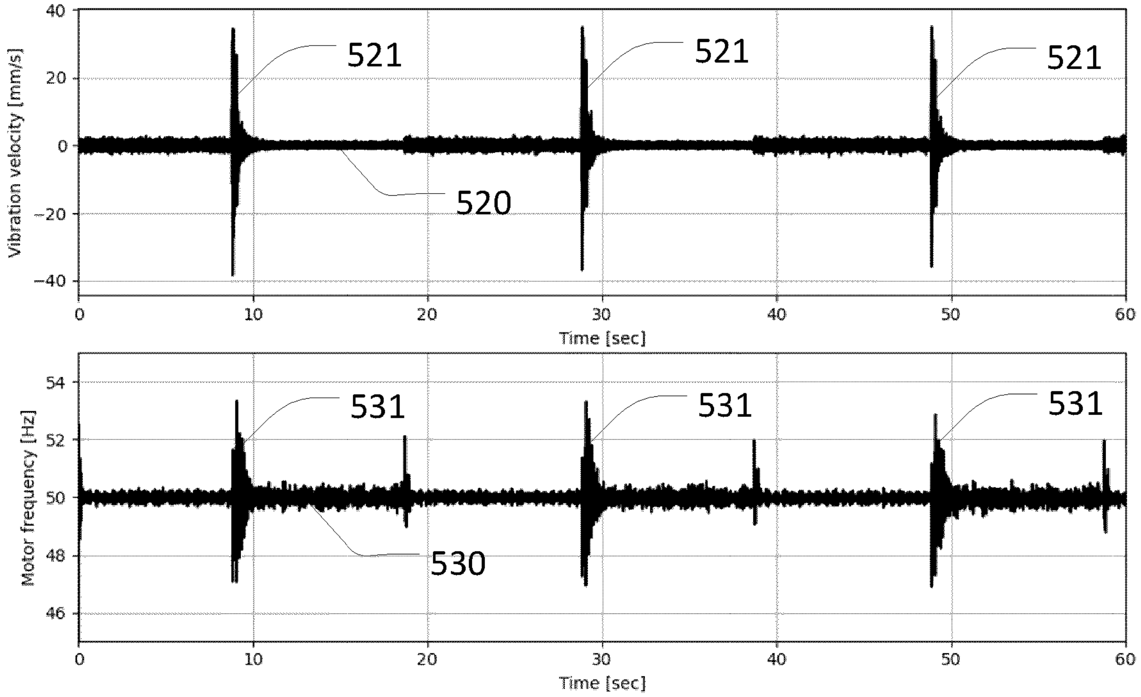
FIG. 5 schematically illustrates a monitored vibration signal and a monitored motor frequency.

FIG. 5 schematically illustrates a monitored vibration signal and a monitored motor frequency. In particular, FIG. 5 shows two graphs representing measured quantities associated with a fluid system in which a liquid is pumped through pipes. The quantities are measured as a function of time and the graphs represent measured values over a period of 60 s. During this time, three distinct hydraulic shock events have occurred. The upper graph 520 is similar to graph 420 of FIG. 4 in that graph 520 illustrates vibrations measured by a vibration sensor positioned on the pump during a period of time where three hydraulic shock events have been detected as distinct peaks 521 in the measured vibration signal.

The lower graph 530 illustrates a measured motor frequency of the electric motor driving the pump. The motor frequency was detected by a magnetic flux sensor attached to the pump. As can be seen from FIG. 5, the motor frequency 530 experiences shock-like disturbances 531 very similar to the vibrational peaks 521 seen in the corresponding vibration signal 520. Accordingly, the inventors have found that the measured motor frequency, or another measure of the motor frequency or the shaft speed driving the pump, can be used as an indicator signal for detecting hydraulic shock events. The measured motor frequency or other measure of the motor frequency or pump speed can be used on its own, e.g. as a sole indicator signal. Alternatively, the measured motor frequency or pump speed can be used as a secondary indicator signal in order to validate that a vibrational shock measured by a vibration sensor is indeed caused by a pressure impulse in the liquid and not caused by physical force applied to the pump structure or connected piping.

Figure 6:
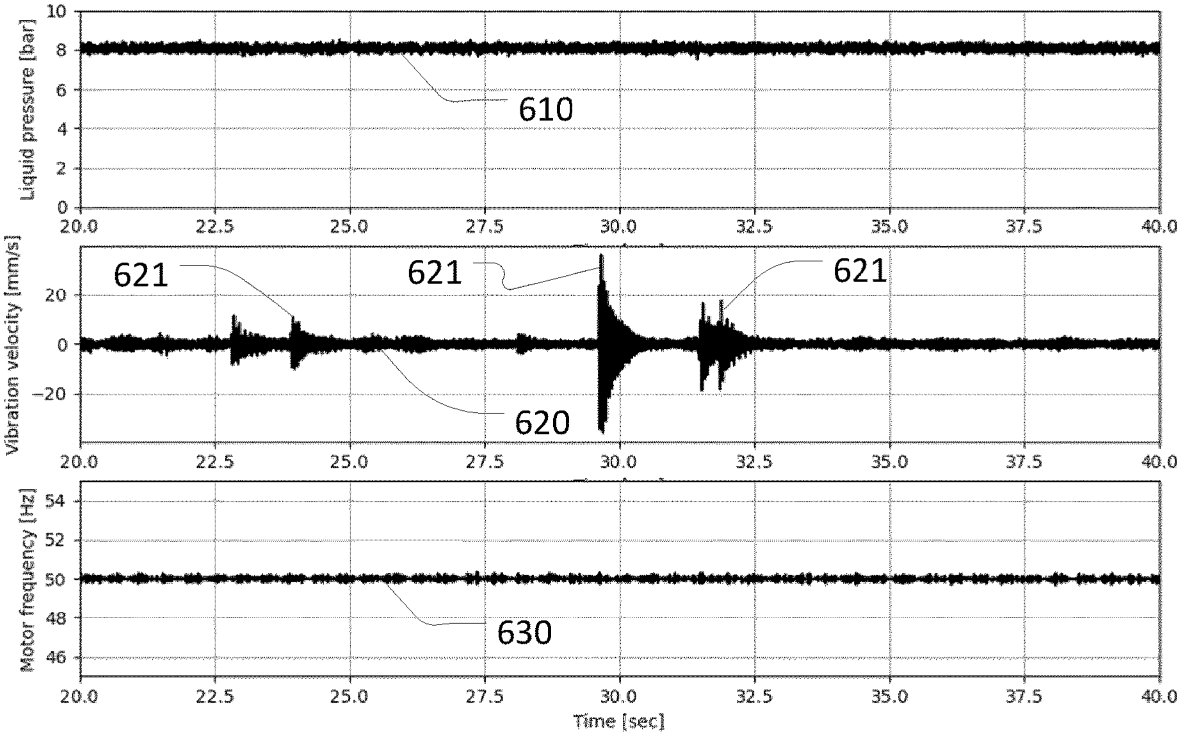
FIG. 6 schematically illustrates a monitored pressure, a monitored vibration signal and a monitored motor frequency.

This is further illustrated by FIG. 6. In particular, FIG. 6 schematically illustrates a monitored liquid pressure signal 610 and corresponding monitored vibration signal 620 and motor frequency signal 630. As above, the graphs represent the respective measured quantities associated with a fluid system in which a liquid is pumped through pipes. The quantities are measured as a function of time and the graphs represent measured values over a period of 40 s. During the measurement period, the pump was excited by applying physical force to the pump structure. The vibrational patterns 622 in the centre plot 620 are very similar to the observed peaks of a hydraulic shock event (e.g. peaks 421 of FIG. 4). However, in this example, both the measured liquid pressure signal 610 and the measured motor frequency signal 630 reveal that there are no shock waves in the liquid. Consequently, by analysing the vibrational signal 620 in combination with the motor frequency signal 630, it can be determined—even without use of a liquid pressure sensor—that the pump is subject to vibrational shocks not caused by a hydraulic shock event.

Figure 7:
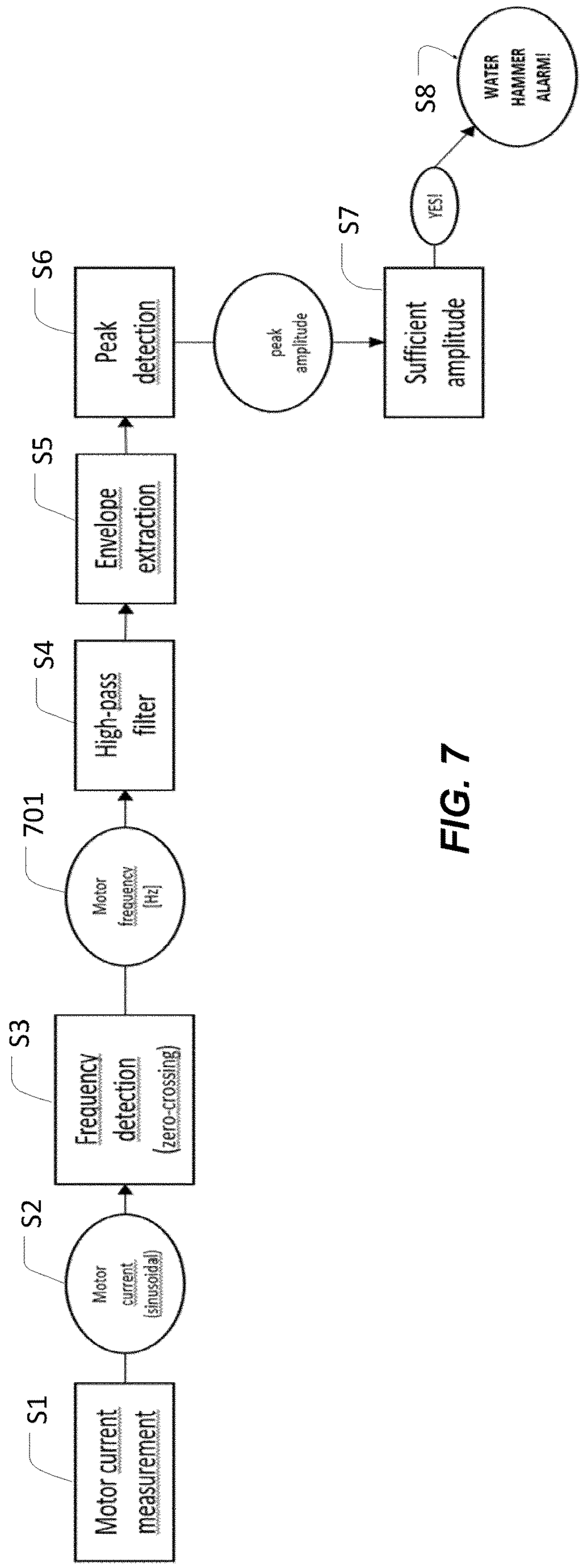
FIG. 7 schematically illustrates a process of detecting a hydraulic shock event.

FIG. 7 schematically illustrates a process of detecting a hydraulic shock event.

Generally, the process receives a measured input signal indicative of a pump speed and/or motor frequency as a function of time. The input signal may be an analogue or digital signal, for example, the digital signal may represent sampled measurement values, sampled at a suitable sampling rate. In the example of FIG. 7, the input signal represents the electrical drive current driving the motor. In other embodiments, other types of input signals indicative of the motor frequency and/or of the pump speed may be used, e.g. a signal indicative of the shaft speed (or shaft frequency) of the shaft driving the pump, or another input signal indicative of the motor frequency, in particular a signal indicative of the varying magnetic field driving the rotor of the motor. The motor frequency and the pump speed are closely related as it is the motor, which is driving the shaft. Apart from a minor slip which can occur in some motor constructions, the shaft speed and the motor frequency will be the same or substantially be the same. Thus in this regard, shaft speed and motor frequency may both be suitable measures for detecting hydraulic shock events.

The shaft speed can be measured or estimated by several means. This may for instance be done by vibrational measurements on the pump structure or by means of a tachometer measuring directly on the shaft. The motor frequency can also be measured in several ways, e.g. by measuring the motor current directly in the motor, or by measuring the magnetic field of the motor, in particular the magnetic flux, e.g. with a coil mounted in the vicinity of the motor or by means of another type of magnetic field sensor.

The process then processes the received signal to identify peaks in the received signal. Based on the identified peaks, the process determines whether a hydraulic shock event has occurred. For example, this determination may be based on the amplitude of the peak and or on a more detailed analysis of the peak envelope.

Referring to FIG. 7, a specific example of the process will now be described. In this example, in initial step S1, the process measures the electrical drive current driving the pump motor. The measurement may be performed by a suitable sensor or be determined by the motor drive circuit. In any event, in step S2, the drive current is fed from the sensor or motor drive circuit to the data processing unit performing the hydraulic shock detection process, i.e. the data processing unit receives the signal indicative of the motor drive current as an input. In step S3, the process detects the frequency of the drive current. In particular, the drive current is normally a sinusoidal signal and the process may perform a detection of zero crossings of the signal to derive the frequency of the drive current as a function of time, which may then serve as a measure 701 of the motor frequency as a function of time. As mentioned above, alternatively, the process may receive another measure of the pump speed and/or motor frequency as a function of time as the input for the hydraulic shock detection. Accordingly, other embodiments may include alternative or additional pre-processing steps in order to derive a suitably signal indicative of the pump speed and/or motor frequency as a function of time.

Optionally, in subsequent step S4, the process performs a high-pass filtering of the frequency signal (or of another measure of the pump speed and/or motor frequency) in order to filter out slowly varying changes of the motor frequency so as to facilitate the detection of fast/sudden fluctuations of the motor frequency and/or pump speed. It will be appreciated that, in other embodiments, the high-pass filtering may be omitted or performed at another point of the signal-processing pipeline, or another type of filtering may be performed in addition or alternatively to the high-pass filtering.

In subsequent step S5, the process may perform an envelope extraction of the, optionally high-pass filtered, frequency signal, resulting in an envelope signal. Again, in some embodiments, the envelope extraction may be omitted and other techniques for detecting peaks in the motor frequency signal (or in a signal representing the pump speed) may be employed, which do not rely on an envelope signal.

In subsequent step S6, the process performs peak detection in the envelope signal and computes the peak amplitude of a detected peak, e.g. using suitable technique for peak detection in a time-dependent signal known as such in the art. For example, the peak amplitude may be computed relative to a baseline. To this end, the process may detect a baseline from the envelope signal, e.g. as an average stable signal level determined over a suitable time period, e.g. over the order of minutes or hours. Alternative or in addition to the peak amplitude, another measure of the magnitude of a peak or otherwise of the significance of the peak may be employed.

In step S7, the process compares the computed peak amplitude with a predetermined threshold. The threshold may be configurable, thus allowing tuning the sensitivity of the hydraulic shock detection. For example, the tuning may be made on a test bed where hydraulic shock events can be induced and reference measurements of liquid pressure can be performed. Alternatively or additionally, other criteria for the detection of peaks that are indicative of a hydraulic shock event may be chosen.

If the computed peak exceeds the threshold, the process proceeds at step S8 and creates a hydraulic shock alert. The hydraulic shock alert may be output in a variety of ways, e.g. as an alert on a user-interface, e.g. as an acoustic and/or visible alert, or as an alert signal that is forwarded to a remote system for user output, logging and/or the like, and/or by directly logging the alert. The process may also output the peak amplitude and/or another computed measure of the severity of the detected hydraulic shock event.

It will be appreciated that a number of variations may be made to the process. For example, creation of a hydraulic shock alert may be conditioned on alternative or additional trigger conditions, e.g. based on one or more other features of the detected peak, e.g. a computed area under the peak, attack and/or decay characteristics of the peak and/or the like. Alternatively or additionally, the process may create different types of alerts, e.g. representing different levels of severity. For example, the process may compare the peak amplitude to two or more different thresholds and create different types of alerts responsive to which thresholds have been exceeded. Yet further, the high-pass filtering and/or the envelope extraction may be omitted or replaced by a different type of filtering or processing.

Figure 8:
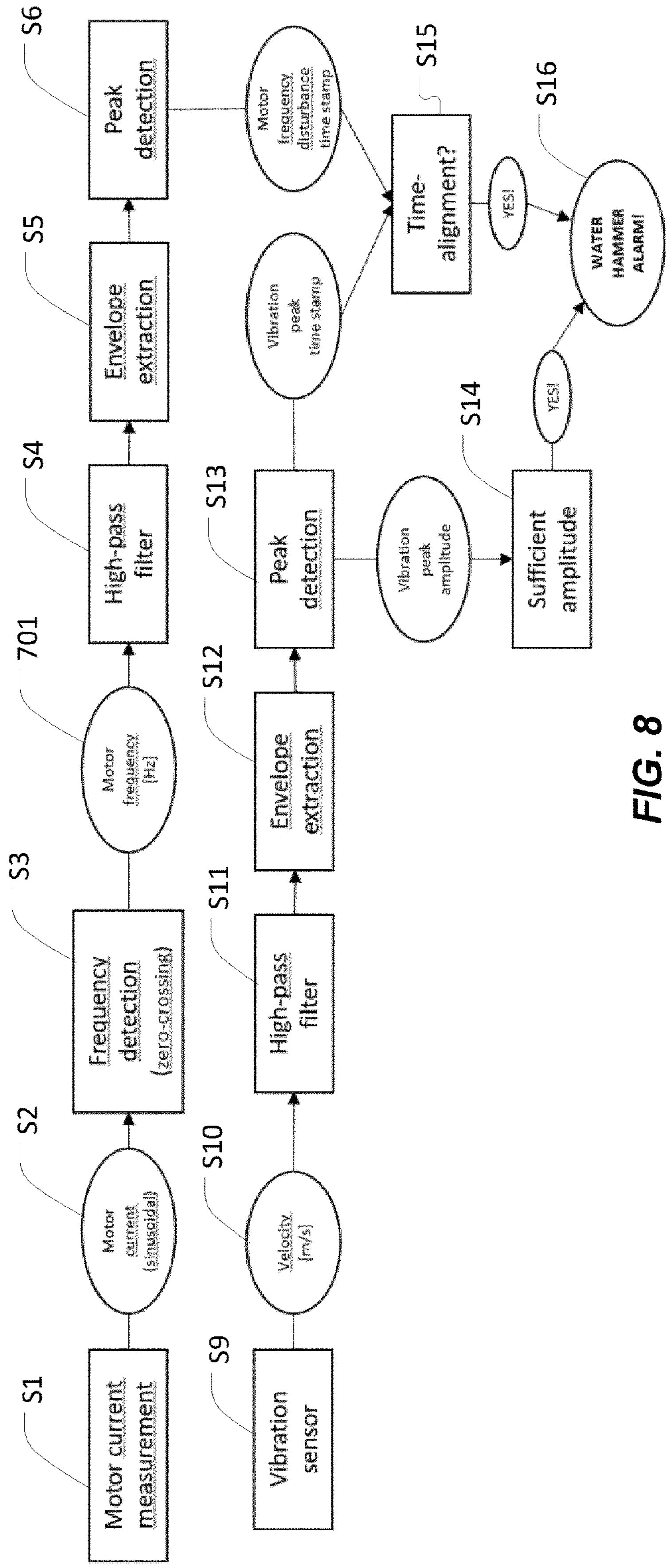
FIG. 8 schematically illustrates another process of detecting a hydraulic shock event.

FIG. 8 schematically illustrates another process of detecting a hydraulic shock event. The process of FIG. 8 bases the hydraulic shock detection on a measured vibration signal and on a measured signal that is indicative of the pump speed and/or motor frequency.

To this end, in steps S1 through S6 of the process of FIG. 8, the process obtains and detects peaks in a signal representing the drive current of the motor driving the pump, e.g. as described in connection with steps S1 through S6 of FIG. 7. As discussed above, in alternative embodiments, another type of pump speed and/or motor frequency signal may be used as input. The process of FIG. 8 differs from the process of FIG. 7 in that the process of FIG. 8 only issues a hydraulic shock alert when at least two trigger conditions are fulfilled, as will now be described in more detail.

In particular, the process concurrently obtains and processes a vibration signal. In particular, in step S9, the process obtains a vibration signal from a vibration sensor.

Generally, vibrations may be measured by means of an accelerometer mounted on the pump structure (or another structural component of the fluid system). However, vibrations could also be measured by other means like a velocity sensor or a displacement sensor. It is also possible to quantify the vibrational patterns of the pump structure by means of for instance a microphone (measuring sound waves) or a high-speed camera. Regardless of the measurement method and the unit by which the vibrations are expressed, it can be beneficial to combine information about shaft/motor frequency with information about vibrational patterns.

The vibration signal may be a signal representing sensed accelerations as a function of time or a signal representing a sensed or derived velocity as a function of time. The inventors have realised that use of a vibration velocity signal provides a more reliable hydraulic shock detection. Accordingly, if the vibration sensor is an accelerometer measuring accelerations (or otherwise a sensor that does not itself provide a vibration velocity signal), it is preferred that the process in subsequent step S10 converts, e.g. by means of an integrator, the measured vibration signal, e.g. a measured vibration acceleration signal, into a corresponding vibration velocity signal. It will be appreciated that other embodiments may base the hydraulic shock event detection on a different type of vibration signal, e.g. directly on a vibration acceleration signal.

Optionally, in subsequent step S11, the process performs a high-pass filtering of the vibration velocity signal in order to filter out slow variations of the measured vibrations. It will be appreciated that, in other embodiments, the high-pass filtering may be omitted or the high-pass filtering may be performed on the received vibration acceleration signal or otherwise at another point of the signal-processing pipeline and/or another type of filtering may be performed in addition to or alternatively to the high-pass filtering.

In subsequent step S12, the process performs an envelope extraction of the, optionally high-pass filtered, velocity signal, resulting in an envelope signal representing a vibration velocity amplitude signal, i.e. the time dependent amplitude of the vibration velocity signal. Again, in some embodiments, the envelope extraction may be omitted and other techniques for detecting peaks in the vibration velocity signal may be employed which do not rely on an envelope signal.

In subsequent step S13, the process performs peak detection in the vibration velocity envelope signal and computes the peak amplitude of any detected peak, e.g. using suitable technique for peak detection in a time-dependent signal known as such in the art. For example, the peak amplitude may be computed relative to a baseline. To this end, the process may detect a baseline from the vibration velocity envelope signal, e.g. as an average stable signal level determined over a suitable time period, e.g. over the order of minutes or hours. Alternative or in addition to the peak amplitude, another measure of the magnitude of a peak or otherwise of the significance of the peak may be employed.

In step S14, the process compares the computed peak amplitude of the velocity envelope with a predetermined threshold. The threshold may be configurable allowable tuning the sensitivity of the hydraulic shock detection, e.g. as described in connection with the pump speed and/or motor frequency signal above. If the peak amplitude exceeds the threshold, the process sets a first trigger condition to TRUE.

Additionally, in step S15, the process compares time stamps of the detected peaks in the motor frequency signal (i.e. the peaks detected in step S6) and of the detected peaks in the vibration signal (i.e. the peaks detected in step S13). If corresponding peaks are detected in both signals in appropriate temporal alignment, the process sets a second trigger condition to TRUE. In particular, the process may set the second trigger condition to TRUE only if there are detected peaks in both signals that are temporally aligned such that they are caused by the same event. It will be appreciated that the temporal alignment does not necessarily require the peaks to be simultaneous but may correspond to a predetermined delay between the two peaks. The delay may depend on the location of the vibration sensor relative to the pump, on the speed at which a shock wave propagates in the fluid being pumped, on the properties of the pump, etc. The proper delay may be determined during an initial calibration of the apparatus or it may be set to a default value or to a suitable time window covering a range of delays that may be expected in typical configurations.

If both trigger conditions are fulfilled, i.e. if a vibration peak of sufficient amplitude has been detected with a corresponding peak in the motor frequency signal in proper temporal alignment, the process proceeds at step S16 and outputs a hydraulic shock alert. The hydraulic shock alert may be output in a variety of ways, e.g. as described in connection with FIG. 7.

It will be appreciated that a number of variations may be made to the process. For example, creation of a hydraulic shock alert may be conditioned on alternative or additional trigger conditions, e.g. based on one or more other features of the detected peak in the vibration signal, e.g. a computed area under the peak, rise and/or fall characteristics of the peak and/or the like. Alternatively or additionally, the process may create different types of alerts, e.g. representing different levels of severity. For example, the process may compare the peak amplitude to two or more different thresholds and create different types of alerts responsive to which thresholds have been exceeded. Yet further, the high-pass filtering and/or the envelope extraction may be omitted or replaced by a different type of filtering or processing. Yet further in some embodiments, the process may condition the issuance of a hydraulic shock alert on detected properties, e.g. a detected amplitude, of the peaks detected in the motor frequency signal alternatively or additionally to using the detected properties of the peaks in the vibration signal.

Figure 9:
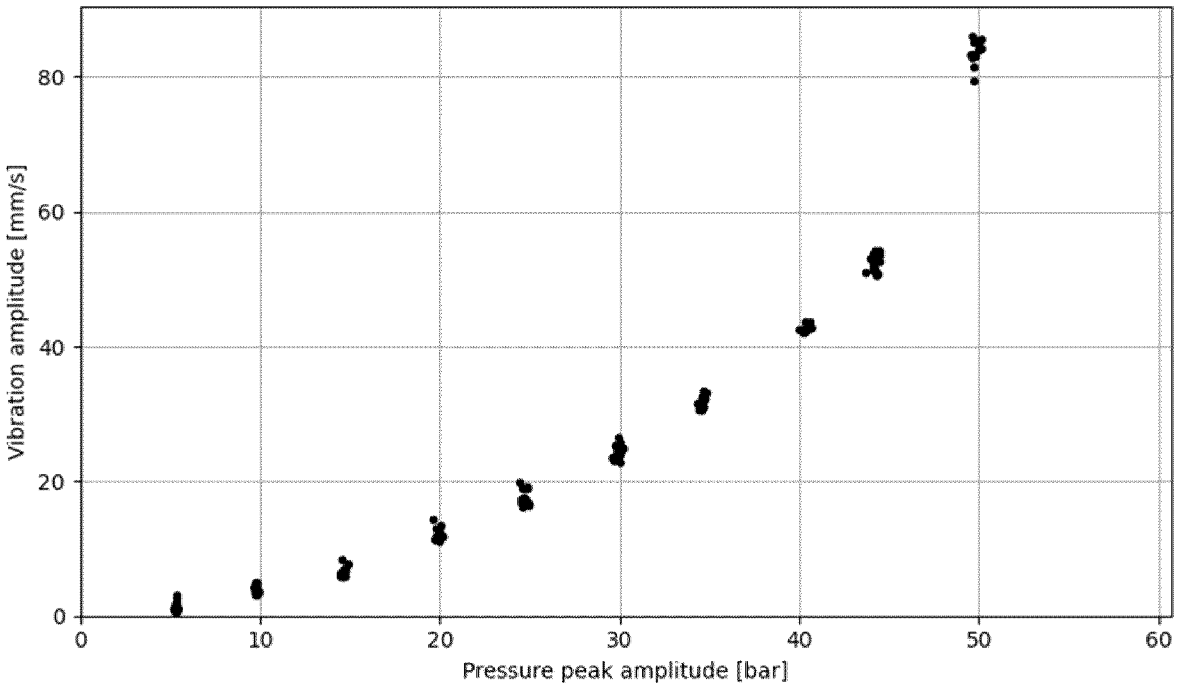
FIG. 9 illustrates the correlation between measured vibration velocities and pressure amplitudes for hydraulic shock events of different severity.

FIG. 9 illustrates the correlation between measured vibration velocities and pressure amplitudes for hydraulic shock events of different severity. As can clearly be seen from FIG. 9, there is a strong correlation between the measured vibration velocities and pressure amplitudes for hydraulic shock events of different severity. The measurements shown in FIG. 9 are for a particular fluid system. It will be appreciated that the absolute values of the vibration measurements may vary from system to system, there will be a clear correlation to the corresponding pressure peaks, thus allowing for a reliable assessment of the severity of hydraulic shock events which may also facilitate the classification of hydraulic shock events based on their severity.

Embodiments of the method described herein can be implemented by means of hardware comprising several distinct elements, and/or at least in part by means of a suitably programmed microprocessor. In the apparatus claims enumerating several means, several of these means can be embodied by one and the same element, component or item of hardware. The mere fact that certain measures are recited in mutually different dependent claims or described in different embodiments does not indicate that a combination of these measures cannot be used to advantage. It should be emphasized that the term "comprises/comprising" when used in this specification is taken to specify the presence of stated features, elements, steps or components but does not preclude the presence or addition of one or more other features, elements, steps, components or groups thereof.

The invention claimed is:

1. An apparatus for detecting a hydraulic shock event in a fluid system, the fluid system comprising a pump assembly, the pump assembly comprising a centrifugal pump, and a pump motor, the apparatus comprising means for monitoring a pump speed of the pump and/or means for monitoring a motor frequency of the pump motor; and a processing unit configured to:

detect a variation in the monitored pump speed and/or a variation in the monitored motor frequency; and detect the hydraulic shock event from the detected variation in the monitored pump speed and/or the detected variation in the monitored motor frequency.

2. The apparatus according to claim 1, wherein the means for monitoring the motor frequency includes a magnetic field sensor and/or a sensor for measuring a drive current of the motor.

3. The apparatus according to claim 1, wherein the pump comprises an impeller and a shaft configured to rotationally drive the impeller, and wherein the monitored pump speed is a monitored shaft speed of the shaft.

4. The apparatus according to claim 1; further comprising a vibration sensor configured to detect vibrations of a component of the fluid system and wherein the processing unit is configured to:

detect a vibration event; and detect the hydraulic shock event responsive to the detected vibration event in addition to the detected variation in the monitored pump speed and/or the detected variation in the monitored motor frequency.

5. The apparatus according to claim 4; wherein the processing unit is configured to detect the hydraulic shock event responsive to the detected vibration having a predetermined temporal relationship with the detected variation in the monitored pump speed and/or the detected variation in the monitored motor frequency.

6. The apparatus according to claim 4, wherein the processing unit is configured to detect the vibration event at least by obtaining a vibration signal and by detecting one or more peaks in the vibration signal.

7. The apparatus according to claim 6, wherein the vibration signal is a vibration velocity signal indicative of a vibration velocity of the one or more components of the fluid system.

8. The apparatus according to claim 6, wherein the processing unit is configured to classify the detected vibration event as the hydraulic shock event responsive to a magnitude of the one or more of the detected peaks exceeding a threshold, and the one or more of the detected peaks having a predetermined temporal relationship with the detected variation in the monitored pump speed and/or the detected variation in the monitored motor frequency.

9. A computer-implemented method for detecting a hydraulic shock event in a fluid system, the fluid system comprising a pump assembly, the pump assembly comprising a centrifugal pump, and a pump motor, the method comprising:

receiving data indicative of a monitored pump speed of the pump from means for monitoring the pump speed of the pump and/or data indicative of a monitored motor frequency of the pump motor from means for monitoring the motor frequency of the pump motor;

detecting a variation in the monitored pump speed and/or a variation in the monitored motor frequency; and detecting the hydraulic shock event from the detected variation in the monitored pump speed and/or the detected variation in the monitored motor frequency.

10. A data processing unit configured to perform the computer-implemented method according to claim 9.

* * * * *